(12) United States Patent
Auerbach et al.

(10) Patent No.: US 7,441,246 B2
(45) Date of Patent: Oct. 21, 2008

(54) CONFIGURABLE COLLECTION OF COMPUTER RELATED METRIC DATA

(75) Inventors: Alan B. Auerbach, Sammamish, WA (US); Shawn M. Murphy, Seattle, WA (US); Walter R Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 10/804,367

(22) Filed: Mar. 19, 2004

(65) Prior Publication Data

US 2005/0210477 A1    Sep. 22, 2005

(51) Int. Cl.
G06F 9/46 (2006.01)
G06F 15/16 (2006.01)
G06F 15/173 (2006.01)
G06F 7/00 (2006.01)

(52) U.S. Cl. ............... 719/310; 719/315; 719/331; 709/201; 709/223; 709/224; 707/100; 707/101; 707/102

(58) Field of Classification Search ......... 719/315–316, 719/310, 331; 709/201–224; 707/100–102
See application file for complete search history.

(56) References Cited

U.S. PATENT DOCUMENTS

| | | | | |
|---|---|---|---|---|
| 5,930,798 | A * | 7/1999 | Lawler et al. ........ | 707/102 |
| 6,345,288 | B1 * | 2/2002 | Reed et al. ........ | 709/201 |
| 6,731,625 | B1 * | 5/2004 | Eastep et al. ........ | 370/352 |
| 6,973,491 | B1 * | 12/2005 | Staveley et al. ........ | 709/224 |
| 6,990,513 | B2 * | 1/2006 | Belfiore et al. ........ | 709/203 |
| 7,072,899 | B2 * | 7/2006 | Lokken ........ | 707/101 |
| 7,110,967 | B1 * | 9/2006 | Espenes et al. ........ | 705/26 |
| 7,149,730 | B2 * | 12/2006 | Mullins et al. ........ | 707/2 |
| 7,151,969 | B2 * | 12/2006 | Bodin et al. ........ | 700/83 |
| 7,162,390 | B2 * | 1/2007 | Jowett et al. ........ | 702/182 |
| 7,263,551 | B2 * | 8/2007 | Belfiore et al. ........ | 709/219 |
| 2002/0178360 | A1 * | 11/2002 | Wenocur et al. ........ | 713/170 |
| 2003/0059004 | A1 * | 3/2003 | Jiang et al. ........ | 379/88.17 |
| 2003/0187763 | A1 * | 10/2003 | Jordan et al. ........ | 705/35 |
| 2003/0208505 | A1 * | 11/2003 | Mullins et al. ........ | 707/102 |
| 2005/0015641 | A1 * | 1/2005 | Alur et al. ........ | 714/2 |
| 2005/0160081 | A1 * | 7/2005 | Casati et al. ........ | 707/3 |
| 2005/0165906 | A1 * | 7/2005 | Deo et al. ........ | 709/217 |
| 2007/0011134 | A1 * | 1/2007 | Langseth et al. ........ | 707/1 |

OTHER PUBLICATIONS

U.S. Appl. No. 10/006,636, for "Service Quality Monitoring System and Method", filed Dec. 3, 2001.

* cited by examiner

*Primary Examiner*—Meng-Ai An
*Assistant Examiner*—Jennifer N To
(74) *Attorney, Agent, or Firm*—Workman Nydegger (57) ABSTRACT

The present invention relates it directed to configurable collection of computer related metric data. A computer system generates computer related metric data related to an application. The application accesses a manifest that indicates a portion of the generated computer related metric data (e.g., a subset) is to be packaged for delivery. The application sends schema-based package start data to cause the portion of generated computer related metric data to be packaged. A quality metric module receives the schema-based package start data and accesses the indicated portion of computer related metric data. The quality metric module packages the portion of computer related metric data according to a packaging schema. The application sends a package send command to cause the packaged portion of computer related metric data to be delivered. The quality metric module receives the package send command and sends the packaged portion of computer related metric data in response to the package send command.

25 Claims, 3 Drawing Sheets

CONFIGURABLE COLLECTION OF COMPUTER RELATED METRIC DATA

BACKGROUND OF THE INVENTION

1. The Field of the Invention

The present invention relates to collecting metric data. More specifically, the present invention relates to configurable collection of computer related metric data.

2. Background and Related Art

The continued popularity of a product often demands that product manufacturers conduct ongoing product improvement. Central to effective product improvement is data on how consumers actually use the product. Various methods exist for attempting to obtain this information. For many products, it is common to employ a group of people, known as a "focus group," whose members are asked to use the product and provide specific comments to the manufacturer either verbally or in writing. Focus group studies are helpful because they can often be conducted before a product, or an improved version thereof, is released to the general public. The manufacturer can thus consider pre-release refinements to the product. Following a product's release to the public, a manufacturer may also obtain information concerning a product's usage by, for example, monitoring calls to the manufacturer's customer service department. Similarly, the manufacturer can monitor consumer comments from various other sources in an attempt to address such comments in a future version of the product.

Effective product improvement has become particularly important for computer software products to remain competitive. The past twenty years have witnessed an exponential growth in the use of personal computers. Driving this popularity to a large extent has been the availability of computer software that users find appealing. At an early point, software for personal computers was largely character-based and employed a limited number of commands whose use could be generally predicted. Thereafter, personal computer software evolved to the now-familiar graphical user interface, such as that exemplified by the Microsoft Windows operating system products.

The shift to a graphical user interface provided many advantages for the user, such as simplifying the knowledge required to effectively use certain computer software. Graphical user interfaces also offered increased user flexibility regarding use and configuration of the computer. As a result, the permutations of individualized usage of personal computers multiplied. Software manufacturers have an increased need to predict and understand how users actually use a personal computer and the software thereon in order to make product improvements that are meaningful for a broad segment of a user population.

To address this need, computer software manufacturers have employed traditional product usage analysis techniques. For example, often a preliminary, or "beta," version software is made available to groups of users who use the software and provide comments to the manufacturer. As with products generally, this approach requires a software manufacturer to rely on users' descriptions of software usage. Information can also sometimes be obtained from customer support incidents relating to the software.

While this methodology is helpful in the software area for identifying some pre-release product problems, it does not always provide comprehensive feedback to the manufacturer about how consumers use the software. For example, if a user experiences difficulties with the software and does not communicate these to the manufacturer, the manufacturer can lose potential insights for product improvement. Moreover, if the software contains features that are not used by a significant user population, the manufacturer may have difficulty in learning of such potentially unnecessary features. In addition, it is often difficult for a manufacturer to precisely gauge the spectrum of hardware and telecommunication environments in which the software is actually used. Product capability could be enhanced by better targeting the software to the actual computing environments in which it is used.

In short, the feedback provided to a software manufacturer by traditional product analysis methods has often become too generalized. Particularly with respect to modern computer software, the feedback often fails to provide a comprehensive picture of hardware and software usage and hinders the quick improvement of software to meet users' demands.

As computer hardware and software usage grows, it is becoming increasingly important to obtain up-to-date performance and usage data from a statistically significant population of users. Traditional techniques are becoming less workable, particularly as users of a given software can now number in the tens of million. Moreover, the current approach leaves many informational gaps in communicating how users actually used a product. These limitations are likely to become more significant, particularly as Internet-enabled, embedded computerized devices proliferate, such as microprocessor-equipped home appliances and other common devices.

To address these and other needs, some mechanisms have been developed for enabling a software manufacturer to record a set of data points about a computer while it is executing an application. The data points contain measurements concerning a status, condition, action, event or other measurable property about the computer. The data point information is thereafter transmitted to a central computer for analysis so that the manufacturer can obtain timely and precise feedback about how an application is being used.

For example, an application can be adapted to measure predetermined parameters about the usage, performance or status of a local computer on which the application is running. Applications that have been adapted to measure predetermined parameters can be referred to as "instrumented applications." The parameters to be measured are determined by the software manufacturer and can include information such as the processor speed of the computer system, the amount of its random access memory or the speed of the computer's Internet access. Upon execution, the instrumented application initiates an instrumentation session and measures the predetermined parameters to obtain values (potentially one or more values for each parameter). The instrumented application then represents the parameters and the corresponding values as data points. A single value data point can record a numeric or alphanumeric value, such as the amount of the computer's random access memory (RAM). A multiple value data point contains a series of numeric or alphanumeric values whereby the order of the values within the stream indicates the order in which the events or other parameters occurred, such as a list of clickable links the user selected.

An instrumentation session can end when a user exits from the instrumented application or when no other parameters are to be measured (even if the instrumented application is still active). When an instrumentation session ends, maintained data points are saved in a session file at the local computer. The local computer system then attempts to transmit the session file to an upload server computer for further processing.

Due to the potential volume of data from multiple instrumentation sessions on multiple computers, session files from various instrumentation sessions can be processed in a distributed server computing environment using queues. As session files are received at an upload server, the upload server examines each session file to determine whether it should be retained based on predetermined criteria. Retained session files are written to a transfer file that is stored in a transfer file queue for transmission to a processing server. The processing server receives the transfer file, parses it to extract a predetermined subset of data points and loads the subset into a raw data database table. The raw data database table information is then summarized according to predetermined criteria and stored in a data warehouse for on-line analytical processing (OLAP) and reporting concerning the measured parameters.

To adapt an application for instrumented functionality, a software manufacturer would insert additional source code statements into the application's source code to measure parameter values at the point during execution when measurement of the selected parameter is desired. For example, a source code statement could be inserted at the logical beginning of the application's source code to measure the local computer's total random access memory and to obtain a value thereof shortly after execution begins. During generation of a corresponding executable file, these additional source code statements are compiled into the executable file. The executable file is subsequently delivered to an end-user. During execution, parameter values are measured in accordance with the additional source code statements.

Unfortunately, since instructions for implementing application instrumentation are compiled into a corresponding executable, the development and financial resources needed to modify what predetermined parameters will be measured or when the predetermined parameters are measured can be quite large. For example, many existing commercially available applications (e.g., word processors, electronic mail clients, etc.) include thousands or even millions of lines of source code statements. Due in part to the magnitude of source code statements, altering or adding even a small portion of source code statements to an existing application may require skilled developers and quality assurance personnel to spend hundreds of hours before some level of reliability in the altered or added source statements is achieved.

However, due to varied computer and network environments or simply to the desire of an administrator, the parameters that are to be measured and when measurements are to occur can change (or vary in importance) with much greater frequency than applications can be instrumented. The inability to efficiently instrument applications based on changing needs, can result in the generation of extraneous data points, insufficient data points, and/or data points that have limited usefulness. For example, measuring data points characteristic of a 64-bit computer may only be relevant when an instrumented application is executed on a 64-bit computer. However, when the instrumented application is run on a 32-bit computer, measurements of the characteristic 64-bit data points may none the less be attempted.

The generation of extraneous data points can unnecessarily consume network bandwidth. That is, an instrumented application may generate a number of data points corresponding to a number of different measurable parameters. All the data points may be transferred from the local computer over a network to a data warehouse. However, analytical processing on the data points may be directed to only a subset of the generated data points. Thus, the remaining generated data points are not used (and may in fact not even be needed) but are still transferred over the network.

On the other hand, failure to generate desirable data points can make determining how an application is being used more difficult. For example, failure to measure both wired and wireless data packets transferred by an application may make it more difficult to identify heavily utilized operating environments. Further, since an instrumented application is often a binary (and thus data collection is hard coded into the instrumented application), collecting different sets of data from different users is relatively difficult. Additionally, instrumented applications provide little, if any, ability to turn on a reduced set of instrumentation at run-time and then turn on additional instrumentation for all or a subset of users without having to replace the user's binaries. Therefore, what would be advantageous are mechanisms that facilitate more flexible collection of computer related metric data.

BRIEF SUMMARY OF THE INVENTION

The foregoing problems with the prior state of the art are overcome by the principles of the present invention, which are directed to configurable collection of computer related metric data. A computer system generates computer related metric data (e.g., memory usage, available disk space, etc.) related to the application. The application accesses a manifest that indicates a portion of the generated computer related metric data (e.g., a subset) is to be packaged for delivery. The application sends schema-based package start data to cause the portion of generated computer related metric data to be packaged.

A quality metric module receives the schema-based package start data and accesses the indicated portion of computer related metric data. The quality metric module packages the portion of computer related metric data according to a packaging schema. The application sends a package send command to cause the packaged portion of computer related metric data (e.g., selected from among all the collected metric data) to be delivered. The quality metric module receives the package send command and sends the packaged portion of computer related metric data in response to the package send command.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to systems, methods, and computer program products for configurable collection of computer related metric data. Embodiments within the scope of the present invention include computer-readable media for carrying or having computer-executable instructions or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

In this description and in the following claims, a "schema" is defined generally as an expression of a shared vocabulary between a plurality of modules and/or components that allows the plurality of modules and/or components to transfer and/or process data according to the expressed shared vocabulary. For example, XML or binary file schemas, can be utilized to define a shared vocabulary between a plurality of modules and/or components.

With respect to XML, an XML schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any module or component that can access an XML schema can process XML documents in accordance with the XML schema. Further, any module or component that can access an XML schema can compose or modify XML documents for use by other modules and/or components that can also access the XML schema.

Schema is further defined to include Document Type Definitions ("DTD"), such as, for example, DTD files ending with a ".dtd" extension and World Wide Web Consortium ("W3C") XML Schemas, such as, for example, XML Schema files ending with a ".xs" extension. However, the actual file extension for a particular DTD or XML schema is not important.

A schema can be utilized to define virtually any data type including logical, binary, octal, decimal, hexadecimal, integer, floating-point, character, character string, user-defined data types, and combinations of these data types used to defined data structures. Some examples of user-defined data types are Date/Time data types representing date and time data and electronic address data types representing electronic address data, such as, for example, Uniform Resource Identifiers ("URIs"). A data type (or entity) can also be defined to reference or link to other data types (or entities) in a schema hierarchy. Accordingly, embodiments of the present invention can utilize schemas to flexibly define various different data formats for packaging computer related metric data.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 1:
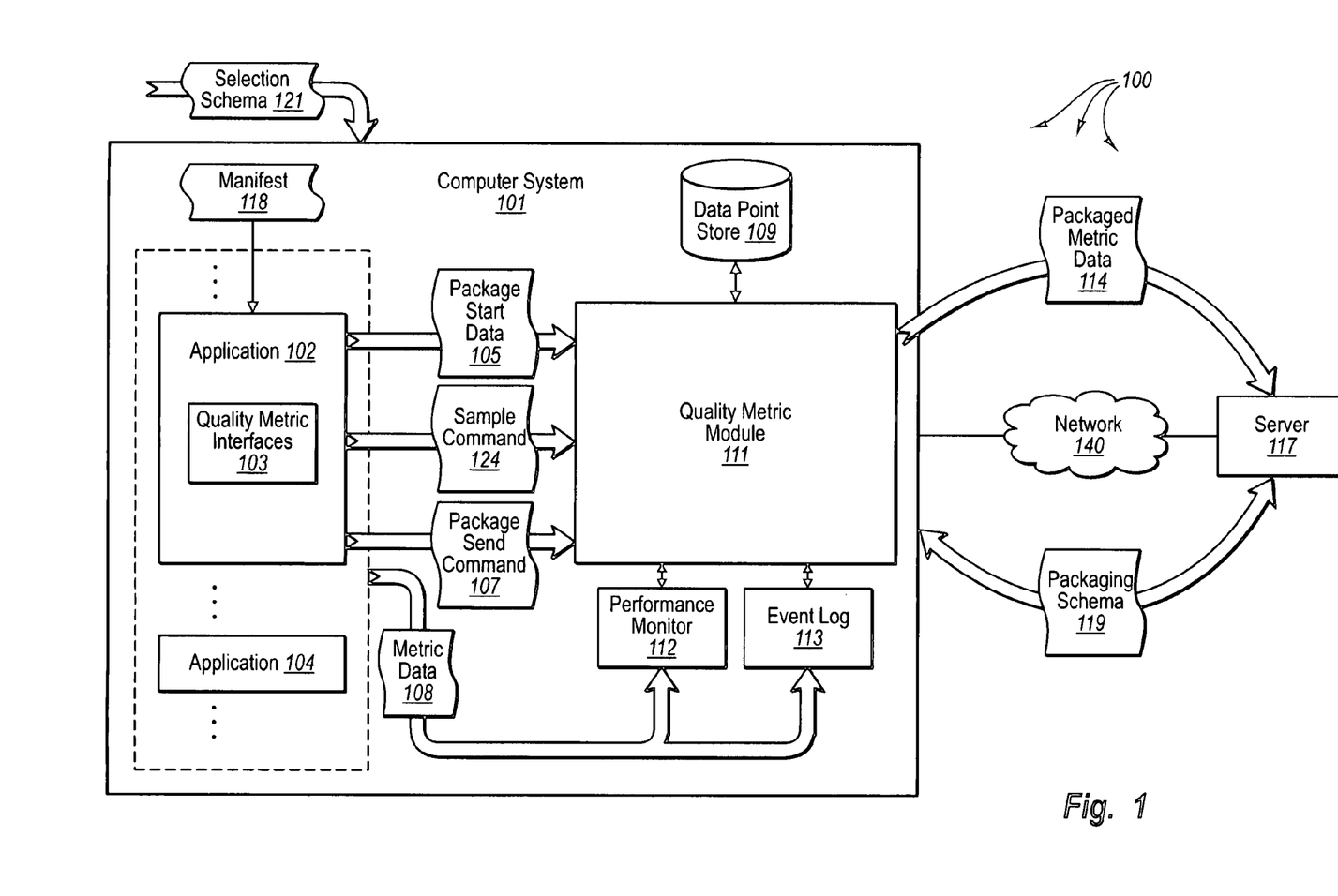
FIG. 1 illustrates example computer architecture that facilitates configurable collection of computer related metric data in accordance with the present invention.

FIG. 1 illustrates example computer architecture 100 that facilitates configurable collection of computer related metric data. Computer system 101 includes one or more applications, such as, for example, application 102 and application 104. Computer system 101 can be configured to generate computer related metric data, for example, related to applications executed at computer system 101. For example, an operating system of computer system 101 can be configured to generate computer related metric data (performance monitoring data and/or event log data) related to applications 102 and 104. Generated computer related metric data can include, for example, available memory or disk space, interrupts per second, network data packets transferred per second, etc.

Further, it may be that applications are configured to generate other computer related metric data. For example, applications 102 and 104 can be configured to generate corresponding computer related metric data. To configure an application to generate computer related metric data, a developer can include appropriate source code instructions within the application. For example, to configure an application to generate performance monitoring data, appropriate source code instructions for accessing a performance monitoring interface (e.g., perflib callback APIs) can be included. A developer can include source code instructions for implementing a set of performance counters that can subsequently be sampled during application execution.

Other computer related metric data that can be generated includes: whether the user is running the debug or retail version of the application, the build number of the application, the number of processors accessing to a computer system, the build number of an operating system, the version number of an operating system, processor speed, processor type, screen resolution of a video display, the user's time zone, the elapsed time a user has been on a network, the number of unsuccessful attempts to access an on-line service, the number of times a user entered an incorrect password while attempting to access an on-line service, the number of times that a "bcc" was used in an outgoing mail message, the number of times that a user clicked on a given user-interface element, such as cut, copy, paste, etc, and the number of times a banner ad was clicked while connected to the Internet. However, it should be understood that the listed computer related metric data represents a small portion of the computer related metric data that could potentially be generated.

Some applications included in computer system 101 can also include an interface for specifying portions (e.g., subsets) of generated computer related metric data that are to be delivered to a server (e.g., for a software developer's review). For example, quality metric interfaces 103 (e.g., one or more Application Programmer Interfaces ("APIs")) can interface with quality metric module 111 to specify portions of metric data 108 that are to be delivered to server 117. Quality metric interface 103 can also indicate to quality metric module 111 that portions of computer related metric data maintained by performance monitor 111 and event log 113 (e.g., stored in system memory) are to be more permanently stored in data point store 109. Quality metric interface 103 can also indicate to quality metric module 111 that statistical operations (e.g., calculating a mean value, calculating a distribution, etc.) are to be performed on computer related metric data stored in data point store 109. In response to data received from quality metric interfaces 103, quality metric module 111 can package metric data for delivery to server 117.

Figure 2:
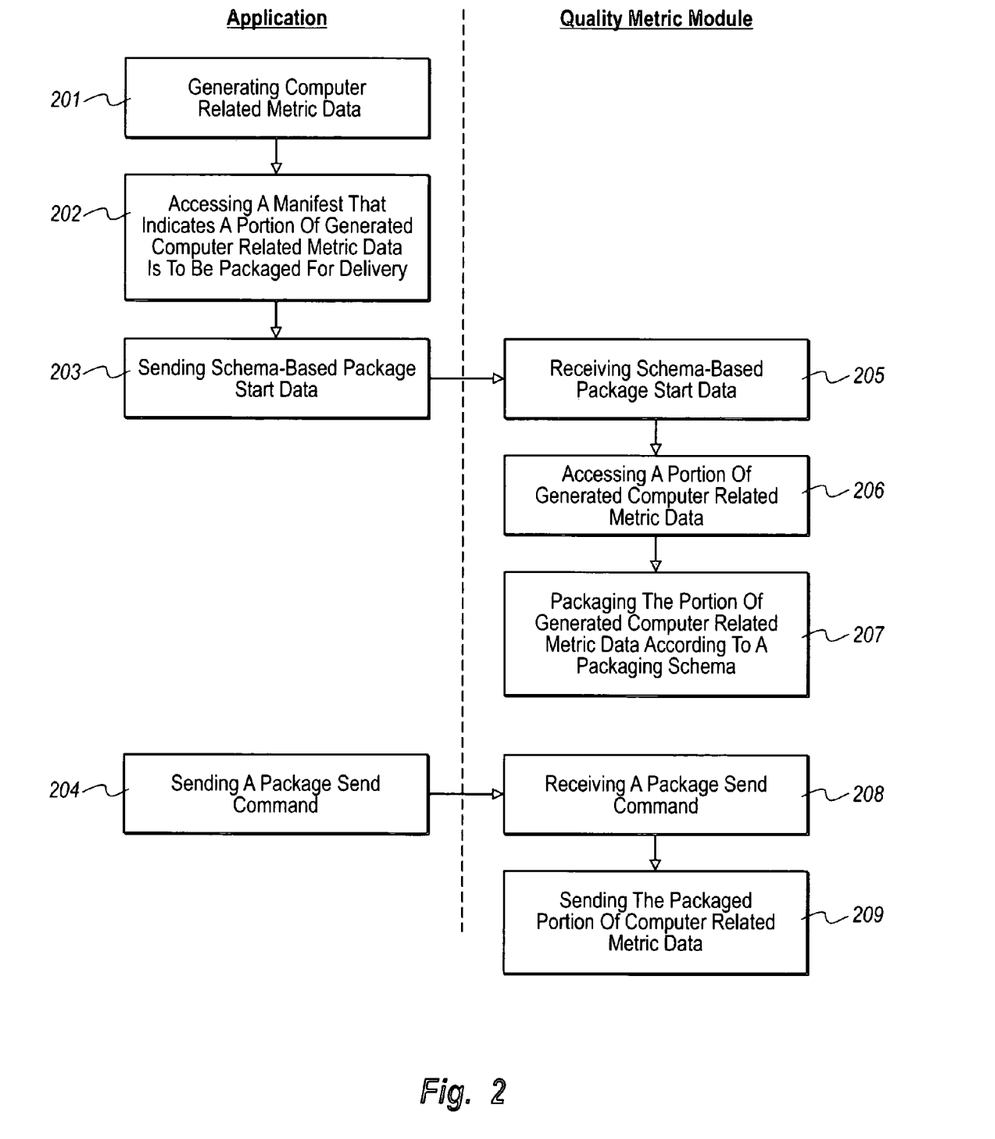
FIG. 2 illustrates a flowchart of an example method for configurable collection of computer related metric data in accordance with the present invention.

FIG. 2 illustrates a flowchart of an example method 200 for configurable collection of computer related metric data in accordance with the present invention. The method 200 will be described with respect to the computer system, server, network, and components depicted in computer architecture 100. The method 200 includes an act of generating computer related metric data (act 201). For example, application 102, a corresponding operating system, and/or other modules accessible to computer system 101 (e.g., a network driver stack) may generate metric data 108.

Some portions of metric data 108 can be performance monitoring data and other portions of metric data 108 can be event log data. Accordingly, performance monitor 112 can maintain some portions of metric data 108 and event log 113 can maintain other portions of metric data 108. Portions of metric data 108 can be maintained in system memory or other storage devices of computer system 101.

The method 200 includes an act of accessing a manifest that indicates a portion of generated computer related metric data is to be packaged for delivery (act 202). For example, application 102 can access manifest 118. Manifest 118 can indicate that a portion of computer related metric data, from among all computer related metric data related to application 102, is to be packaged for delivery. For example, manifest 118 may indicate a subset of metric data 108 that is to be packaged for delivery for server 117.

Manifest 118 can also indicate that one or more statistical operations (e.g., calculating a mean value, calculating a distribution, etc.) are to be performed on an indicated portion of metric data. For example, manifest 118 can indicate that a representation of available system memory is to be stored in data point store 109 every hour and that a mean value of the allocated system memory (e.g., per day) is to be calculated.

A manifest can include instructions that are dynamically linkable to an application (e.g., included in a Dynamic Link Library ("DLL")). For example, manifest 118 can include instructions that are dynamically linkable to application 102. That is, during execution, application 102 can access and execute instructions included in manifest 118.

When appropriate, manifest 118 can be replaced with another different manifest (e.g., by downloading a new manifest or installing a new manifest from removable storage media). A replacement manifest can indicate that a different portion of computer related metric data, from among all computer related metric data related to application 102, is to be packaged for delivery. Similarly, a replacement manifest can indicate different statistical operations that are to be performed on an indicated portion of computer related metric data. Thus, different manifests can be utilized to package and perform statistical operations on different portions of computer related metric data. Accordingly, a developer or administrator can more easily change the computer related metric data that is packaged for delivery (by changing a manifest), for example, in response to changed software development priorities or to perform more extensive studies with respect to a particular portion of computer related metric data.

Further, different manifests can be utilized at different computer systems. For example, it may be that other computer systems (not shown) in addition to computer system 101 include application 102. These other computer systems can utilize different manifests (i.e., different from manifest 118) to indicate different portions of computer related metric data, from among all the computer related metric data related to application 102 (generated at the other computer systems). Thus, different portions of metric data can be indicated at different computing systems. Utilizing different manifests may be particularly advantageous when performing studies of commercially available applications without significantly invading the privacy of non-participating users. Participating users can be given manifests that indicate more extensive computer related metric data, while non-participating users are given (or simply retain) manifests that indicate less extensive (or even no) computer related metric data.

The method 200 includes an act of sending schema-based package start data (act 203). For example, application 102 can send package start data 105. Package start data 105 can include elements and attributes of a vocabulary defined in selection schema 121 (e.g., an XML schema). Selection schema 121 can define elements and attributes that, when received at quality metric module 111, indicate to quality metric module 111 that a portion of generated computer related metric data is to be packaged. Selection schema 121 can define elements and attributes for indicating that performance data (e.g., maintained by performance monitor 112) and/or indicating that event log data (e.g., maintained by event log 113) is to be packaged for delivery. Selection schema 121 can also define elements and attributes for indicating that statistical operations are to be performed. Selection schema 121 can also define elements and attributes for indicating a server that is to receive packaged metric data.

Quality metric interfaces 103 can include instructions for converting manifest 118 into package start data defined in accordance with selection schema 121. For example, quality metric interfaces 103 can include an interface that loads a package configuration data and provides a handle for a corresponding package instance. Package configuration data can include XML instructions (e.g., metadata) defined in accordance with selection schema 121.

Application 102 can check privacy and security policies of computer system 101 before sending package start data 105. When privacy and/or security policies do not permit collection of computer related metric data, package start data 105 is not sent. On the other hand, when privacy and/or security policies do permit collection of computer related metric data, package start data 105 is set. Accordingly, a user of computer system 101 can configure privacy and/or security polices to override (and prevent) the delivery of a portion of computer related metric data indicated in a manifest.

The method 200 includes an act of receiving schema-based package start data (act 205). For example, quality metric module 111 can receive package start data 105. The method 200 includes an act of accessing a portion of generated computer related metric data (act 206). For example, quality metric module 111 can access a portion of metric data 108 as indicated in package start data 105. Quality metric module 111 can access computer related metric data maintained by performance monitor 112 and event log 113 or metric data stored in data point store 109.

From time to time, quality metric module 111 can sample generated metric data from system memory (e.g., utilized by performance monitor 112 and/or event log 113). Quality metric module 111 can store sampled metric data in data point store 109. Data point store 109 can be maintained in a mass storage device (e.g., a hard disk) that provides more permanent storage. Accordingly, data point store 109 is advantageous for retaining metric data, for example, to perform statistical operations or when computer system 101 is powered down (and the contents of system memory are lost).

It may be that quality metric module 111 samples generated metric data in response to a command (e.g., sample command 124) from application 102. For example, quality metric interfaces 103 can include instructions for sending a sample command to quality metric module 111. For example, quality metric interfaces 103 can include an interface that sends a package handle (e.g., previously received in package start data) and indicates that all the metric data indicated in a manifest is to be sampled. Quality metric interfaces 103 can also include an interface that sends a package handle (e.g., previously received in package start data) and indicates that a particular item or event, from among all the computer related metric data indicated in a manifest, is to be sampled. Accordingly, subsequent to receiving package start command 105, quality metric module 111 can receive one or more sample commands from application 102. In response to the sample commands, quality metric module 111 can retrieve generated metric data from system memory and store the generated metric data in data point store 109.

The method 200 includes an act of packaging the portion of generated computer related metric data according to a packaging schema (act 207). For example, quality metric module 111 can package a portion of metric data 108 according to packaging schema 119 (e.g., an XML schema). Quality metric module 111 can package (sampled) metric data from data point store 109 and/or can package metric data from system memory.

Packaging schema 119 can define elements and attributes for indicating performance data and event log data and corresponding values. Packaging schema 119 can also define elements and attributes for indicating statistical operations and corresponding values. Packaging schema 119 can also define elements and attributes for indicating errors.

It may be that computer related metric data is packaged into an array. Embodiments of the present invention can utilize state-based arrays, event-based arrays, and mixed arrays. State-based arrays can be implemented using multiple instances of a performance counter (e.g., maintained by performance monitor 112). For example, an instance block containing counters for each element in the array is created. A data point specifying a URI for the counter is defined. Accordingly, when the counter is sampled, all instances of the counter are enumerated and a two-by-two array is created. The first position in each row of the two-by-two array indicates the name of the instance and the second position in each row of the two-by-two array indicates the value for the counter.

Event-based arrays can be implemented as events from an event log (e.g., event log 113). For example, a set of events that are to be collected are defined. A mapping between events and corresponding array positions is defined (e.g., in selection schema 121). When an event is read, the event is populated into the mapped position in the array. Mixed arrays can be populated both with performance counters and corresponding values and with events.

The method 200 includes an act of sending a package send command (act 204). For example, application 102 can send package send command 107. Quality metric interfaces 103 can include instructions for indicating to quality metric module 111 that a package is to be delivered. For example, quality metric interfaces 103 can include an interface that references a package handle (e.g., previously received in package start data) and indicates that the referenced package is to be delivered. The interface can also indicate whether the references package is to be retained. It may be that a package send command includes a "dispose flag" that indicates whether or not a package is to be disposed of after it is queued (e.g., into an upload queue) for delivery.

The method 200 includes an act of receiving a package send command (act 208). For example, quality metric module 111 can receive package send command 107. The method 200 includes an act of sending the packaged portion of computer related metric data (act 209). For example, quality metric module 111 can send packaged metric data 114. Package metric data 114 can be a portion of metric data 108 packaged in accordance with packaging schema 119.

Computer system 101 can send packaged metric data 114 over network 140 to server 117. Network 140 can be Local Area Network ("LAN"), a Wide Area Network ("WAN"), or even the Internet. Network 140 can include wired and/or wireless components. Server 117 can be a computer system, for example, of a software developer, which collects metric data. Server 117 can interpret packed metric data 114 according to the defined elements and attributes in packaging schema 119.

Figure 3:
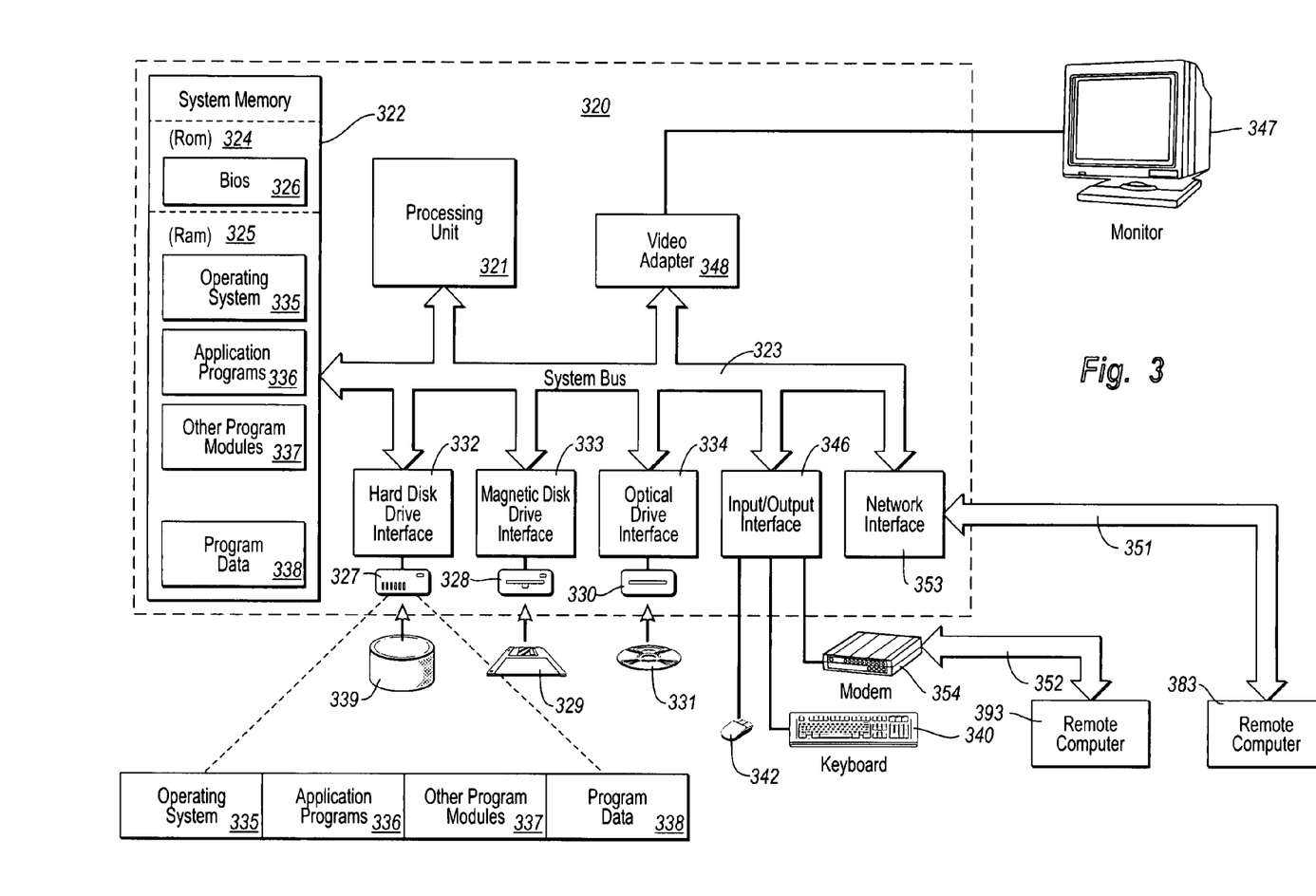
FIG. 3 illustrates a suitable operating environment for implementing the principles of the present invention.

FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 3, an example system for implementing the invention includes a general-purpose computing device in the form of computer system 320, including a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIO") 326, containing the basic routines that help transfer information between elements within computer system 320, such as during start-up, may be stored in ROM 324. It may be that performance monitor 112 and event log 113 maintain corresponding performance data and event log data in RAM 325.

The computer system 320 may also include magnetic hard disk drive 327 for reading from and writing to magnetic hard disk 339, magnetic disk drive 328 for reading from or writing to removable magnetic disk 329, and optical disk drive 330 for reading from or writing to removable optical disk 331, such as, or example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide nonvolatile storage of computer-executable instructions, data structures, program modules, and other data for the computer system 320. Although the example environment described herein employs magnetic hard disk 339, removable magnetic disk 329 and removable optical disk 331, other types of computer-readable media for storing data can be used, including magnetic cassettes, flash memory cards, digital versatile disks, Bernoulli cartridges, RAMs, ROMs, and the like. Data point store 109 can be contained in one or more of these nonvolatile storage locations.

Program code means comprising one or more program modules may be stored on hard disk 339, magnetic disk 329, optical disk 331, ROM 324 or RAM 325, including an operating system 335, one or more application programs 336, other program modules 337, and program data 338. A user may enter commands and information into computer system 320 through keyboard 340, pointing device 342, or other input devices (not shown), such as, for example, a microphone, joy stick, game pad, scanner, or the like. These and other input devices can be connected to the processing unit 321 through input/output interface 346 coupled to system bus 323. Input/output interface 346 logically represents any of a wide variety of possible interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 347 or other display device is also connected to system bus 323 via video interface 348. Monitor 347 can display monochrome and/or color graphical objects, including text, generated by computer system 320. Other peripheral devices (not shown), such as, for example, speakers, printers, and scanners, can also be connected to computer system 320.

Computer system 320 is connectable to networks, such as, for example, an office-wide or enterprise-wide computer network, a home network, an intranet, and/or the Internet. Computer system 320 can exchange data with external sources, such as, for example, remote computer systems, remote applications, and/or remote databases over such networks.

Computer system 320 includes network interface 353, through which computer system 320 receives data from external sources and/or transmits data to external sources. As depicted in FIG. 3, network interface 353 facilitates the exchange of data with remote computer system 383 via link 351. Network interface 353 can logically represent one or more software and/or hardware modules, such as, for example, a network interface card and corresponding Network Driver Interface Specification ("NDIS") stack. Link 351 represents a portion of a network (e.g., an Ethernet segment), and remote computer system 383 represents a node of the network.

Likewise, computer system 320 includes input/output interface 346, through which computer system 320 receives data from external sources and/or transmits data to external sources. Input/output interface 346 is coupled to modem 354 (e.g., a standard modem, a cable modem, or digital subscriber line ("DSL") modem), through which computer system 320 receives data from and/or transmits data to external sources. As depicted in FIG. 3, input/output interface 346 and modem 354 facilitate the exchange of data with remote computer system 393 via link 352. Link 352 represents a portion of a network and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

In accordance with the present invention, modules, such as, for example, applications 102 and 104 and quality metric module 111 as well as associated program data, such as, for example, manifest 118, metric data 108, package start data 105, package send command 107, sample command 124, packaged metric data 114, selection schema 121, and packaging schema 119, can be stored and accessed from any of the computer-readable media associated with computer system 320. For example, portions of such modules and portions of associated program data may be included in operating system 335, application programs 336, program modules 337 and/or program data 338, for storage in system memory 322.

When a mass storage device, such as, for example, magnetic hard disk 339, is coupled to computer system 320, such modules and associated program data may also be stored in the mass storage device. In a networked environment, program modules depicted relative to computer system 320, or portions thereof, can be stored in remote memory storage devices, such as, system memory and/or mass storage devices associated with remote computer system 393 and/or remote computer system 383. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for specifying computer related metric data that is generated by a computer system to be delivered to a server, the method comprising:

executing an application at the computer system;

generating metric data related to functionality of the application monitored during execution of the application, the generated metric data including at least one of performance monitoring data and event log data for the application;

storing the metric data related to the monitored functionality of the application at the computer system;

accessing a separately defined manifest including instructions that indicates a subset of the generated metric data related to the monitored functionality of the application is to be packaged for delivery to a server subsequent to storing the generated metric data, the separately defined manifest being separate from the generated metric data and separate from the application, the extent of the subset of the generated metric data relative to the total generated metric data configured in accordance with a desire of a user of the computer system;

converting the instructions included in the separately defined manifest to a schema-based package start command, the schema-based package start command including elements and attributes of a vocabulary defined in a selection schema, the selection schema defining how subsets of performance monitoring data and subsets of event log data are to be packaged;

automatically sending the schema-based package start command to a quality metric module to cause the subset of the generated metric data indicated in the separately defined manifest to be packaged for delivery to the server; and sending a package send command to the quality metric module to cause the packaged subset of generated metric data related to the monitored functionality of the application to be delivered to the server.

2. The method as recited in claim 1, wherein generating metric data comprises an operating system generating metric data related to the functionality of the application.

3. The method as recited in claim 1, wherein generating metric data comprises the application generating metric data related to the functionality of the application.

4. The method as recited in claim 1, wherein accessing a separately defined manifest comprises the application accessing a dynamic link library.

5. The method as recited in claim 1, wherein accessing a separately defined manifest comprises accessing a manifest that indicates a portion of performance monitoring data related to the functionality of the application is to be packaged for delivery.

6. The method as recited in claim 1, wherein accessing a separately defined manifest comprises accessing a manifest that indicates a portion of event log data related to the functionality of the application is to be packaged for delivery.

7. The method as recited in claim 1, wherein accessing a separately defined manifest comprises accessing a manifest that indicates statistical operations that are to be performed on generated metric data related to the functionality of the application.

8. The method as recited in claim 1, wherein converting instructions included in the separately defined manifest to the schema-based package start command comprises converting the instructions included in the separately defined manifest into XML instructions.

9. The method as recited in claim 1, wherein sending the schema-based package start command comprises sending XML instructions to the quality metric module to indicate to the quality metric module that a subset of the generated metric data related to the functionality of the application is to be packaged for delivery.

10. The method as recited in claim 1, further comprising:

sending a sample command to the quality metric module, the sample command indicating that—the quality metric module is to sample at least one item or event represented in the separately defined manifest.

11. The method as recited in claim 10, wherein sending a sample command comprises sending a sample command that indicates that the metric data represented in the separately defined manifest is to be sampled.

12. The method as recited in claim 1, wherein sending a package send command comprises sending a dispose flag that indicates whether or not a corresponding package is to be retained after the package is queued for delivery.

13. The method as recited in claim 1, wherein accessing a separately defined manifest that indicates a subset of the generated metric data related to the monitored functionality of the application is to be packaged comprises accessing a separately defined manifest specifically selected by a developer to configure the subset of generated metric data for use in studying the monitored functionality of the application.

14. A computer system that includes a quality metric module, the quality metric module configured to package computer related metric data for delivery, a method for packaging specified computer related metric data, the method comprising:

receiving a schema-based package start command from an application, the schema-based package start command indicating that a subset of previously stored metric data related to monitored functionality of the application is to be packaged for delivery to a server, the schema-based package start command including XML instructions that indicate a subset of generated metric data related to the monitored functionality of the application is to be packaged for delivery, the generated metric data including at least one of performance monitoring data and event log data for the application, the subset of the previously stored metric data indicated in a separately defined manifest that is separate from the application and separate from the generated metric data, the extent of the subset of the previously stored metric data relative to the total generated metric data configured in accordance with the desire of a user of the computer system, the schema-based package start command and XML instructions including elements and attributes of a vocabulary defined in a selection schema, the selection schema defining how to indicate that subsets of performance monitoring data and subsets of event log data are to be packaged;

accessing the indicated subset of generated metric data related to the monitored functionality of the application from computer system storage;

packaging the subset of generated metric data related to the functionality of the application according to a packaging schema defining elements and attributes used at the server;

receiving a package send command from the application; and sending the packaged subset of metric data related to the functionality of the application to the server in response to the package send command.

15. The method as recited in claim 14, further comprising:

receiving a sample command;

retrieving at least one item or event related to the monitored functionality of the application from system memory; and storing the at least one item or event —in a data point store.

16. The method as recited in claim 15, wherein retrieving at least one item or event from system memory comprises retrieving all the metric data indicated in the XML instructions.

17. The method as recited in claim 14, wherein accessing the -subset of generated metric data related to the monitored functionality of the application comprises accessing the subset of generated —metric data related to the monitored functionality of the application from a data point store.

18. The method as recited in claim 17, further comprising:

performing a statistical operation based on the accessed subset of metric data related to the monitored functionality of the application.

19. The method as recited in claim 14, wherein packaging the subset of generated metric data related to the monitored functionality of the application according to a packaging schema comprises converting the subset of generated metric data related to the monitored functionality of the application into second XML instructions in accordance with an XML schema.

20. The method as recited in claim 14, wherein packaging the subset of generated metric data related to the monitored functionality of the application according to a packaging schema comprises packing —metric data related to the monitored functionality of the application in an array.

21. The method as recited in claim 14, wherein receiving a package send command comprises receiving a dispose flag that indicates whether or not a corresponding package is to be retained after the package is queued for delivery.

22. The method as recited in claim 14, wherein sending the packaged subset of —metric data related to the monitored functionality of the application to the server comprises sending the packaged subset of —metric data related to the functionality of the application to a server that collects computer related metric data for an application developer of the application.

23. The method as recited in claim 14, wherein receiving a schema-based package start-command in the form of XML instructions from an application comprises receiving a schema-based package start command based on a separately defined manifest specifically selected by a developer to configure the subset of generated metric data for use in studying the monitored functionality of the application.

24. A computer program product for use at a computer system that is configured to generate computer related metric data associated with the application, the computer program product for implementing a method for specifying computer related metric data that is to be delivered to a server, the computer program product stored on one or more computer-readable media having computer-executable instructions that, when executed by a processor, cause the computer system to perform the following:

execute an application at the computer system;

generate metric data related to functionality of the application monitored during execution of the application, the generated metric data including at least one of performance monitoring data and event log data for the application;

store the metric data related to the monitored functionality of the application at the computer system;

access a separately defined manifest including instructions that indicates a subset of the generated metric data related to the monitored functionality of the application is to be packaged for delivery to a server subsequent to storing the generated metric data, the separately defined manifest being separate from the generated metric data and separate from the application, the extent of the subset of the generated metric relative to the total generated metric data configured in accordance with a desire of a user of the computer system;

convert the instructions included in the separately defined manifest to a schema-based package start command, the schema-based package start command including elements and attributes of a vocabulary defined in a selection schema, the selection schema defining how subsets of performance monitoring data and subsets of event log data are to be packaged; s send the schema-based package start command to a quality metric module to cause the subset of the generated metric data indicated in the separately defined manifest to be packaged for delivery to the server; and send a package send command to the quality metric module to cause the packaged subset of generated metric data related to the monitored functionality of the application to be delivered to the server.

25. A computer program product for use at a computer system that includes a quality metric module, the quality metric module configured to package computer related metric data for delivery, the computer program product for implementing a method for packaging specified computer related metric data, the computer program product stored on one or more computer-readable media having computer-executable instructions that, when executed by a processor, cause the computer system to perform the following:

receive a schema-based package start command from an application, the schema-based package start command indicating that a subset of previously stored metric data related to monitored functionality of the application is to be packaged for delivery to a server, the schema-based package start command including XML instructions that indicate a subset of generated metric data related to the monitored functionality of the application is to be packaged for delivery, the generated metric data including at least one of performance monitoring data and event log data for the application, the subset of the previously stored metric data indicated in a separately defined manifest that is separate from the application and separate from the generated metric data, the extent of the subset of the previously stored metric data relative to the total generated metric data configured in accordance with the desire of a user of the computer system, the schema-based package start command and XML instructions including elements and attributes of a vocabulary defined in a selection schema, the selection schema defining how subsets of performance monitoring data and subsets of event log data are to be packaged;

access the indicated subset of generated metric data related to the monitored functionality of the application from computer system storage;

package the subset of generated metric data related to the functionality of the application according to a packaging schema defining elements and attributes used at the server;

receive a package send command from the application; and send the packaged subset of metric data related to the functionality of the application to the server in response to the package send command.

* * * * *